(12) United States Patent
Chen et al.

(10) Patent No.: US 10,773,962 B2
(45) Date of Patent: Sep. 15, 2020

(54) PREPARATION METHOD FOR BINDER-FREE, COAL-BASED, BRIQUETTED ACTIVATED CARBON

(71) Applicants: CHINA ENERGY INVESTMENT CORPORATION LIMITED, Beijing (CN); SHENHUA XINJIANG ENERGY CO., LTD., Urumqi, Xinjiang (CN)

(72) Inventors: Jianqiang Chen, Xinjiang (CN); Xintian Xu, Xinjiang (CN); Long Zhao, Xinjiang (CN); Hongqiang Wang, Xinjiang (CN); Xiaolin Han, Xinjiang (CN); Xiaodong Lu, Xinjiang (CN); Tao Qi, Xinjiang (CN); Wei Zhuang, Xinjiang (CN); Jin Li, Xinjiang (CN); Liangliang Wu, Xinjiang (CN); Jianrui Li, Xinjiang (CN); Cheng Wang, Xinjiang (CN)

(73) Assignees: CHINA ENERGY INVESTMENT CORPORATION LIMITED, Beijing (CN); SHENHUA XINJIANG ENERGY CO., LTD., Urumqi, Xinjiang (CN)

( * ) Notice: Subject to any disclaimer, the term of this patent is extended or adjusted under 35 U.S.C. 154(b) by 110 days.

(21) Appl. No.: 16/089,258

(22) PCT Filed: Jan. 26, 2017

(86) PCT No.: PCT/CN2017/072715
§ 371 (c)(1),
(2) Date: Sep. 27, 2018

(87) PCT Pub. No.: WO2017/166920
PCT Pub. Date: Oct. 5, 2017

(65) Prior Publication Data
US 2019/0119119 A1    Apr. 25, 2019

(30) Foreign Application Priority Data
Mar. 31, 2016    (CN) .......................... 2016 1 0201435

(51) Int. Cl.
| | |
|---|---|
| *C01B 32/336* | (2017.01) |
| *C01B 32/384* | (2017.01) |
| *C01B 32/318* | (2017.01) |
| *B30B 11/16* | (2006.01) |
| *B30B 15/30* | (2006.01) |

(52) U.S. Cl.
CPC ............ *C01B 32/336* (2017.08); *B30B 11/16* (2013.01); *B30B 15/308* (2013.01); *C01B 32/318* (2017.08); *C01B 32/384* (2017.08)

(58) Field of Classification Search
None
See application file for complete search history.

(56) References Cited

U.S. PATENT DOCUMENTS

| | | | |
|---|---|---|---|
| 3,539,467 A | 11/1970 | Bozarth et al. | |
| 3,951,856 A | 4/1976 | Repik et al. | |

FOREIGN PATENT DOCUMENTS

| | | | |
|---|---|---|---|
| CN | 1033262 A | | 6/1989 |
| CN | 1456644 A | | 11/2003 |
| CN | 101168694 A | | 4/2008 |
| CN | 101402454 A | | 4/2009 |
| CN | 101722669 A | | 6/2010 |
| CN | 102126722 A | | 7/2011 |
| CN | 102126722 A | * | 7/2011 |
| CN | 102530938 A | | 7/2012 |
| CN | 104276570 A | | 1/2015 |
| CN | 105692614 A | | 6/2016 |
| CN | 105779059 A | | 7/2016 |
| CN | 105800610 A | | 7/2016 |
| CN | 105883802 A | | 8/2016 |
| JP | S4953601 A | | 5/1974 |
| JP | S6311512 A | | 1/1988 |
| JP | H01317113 A | | 12/1989 |
| JP | H0421511 A | | 1/1992 |
| JP | 2001170481 A | | 6/2001 |
| JP | 2006083052 A | | 3/2006 |

OTHER PUBLICATIONS

Google translation CN102126722; Mar. 16, 2020.*
Extended European Search Report for EP Application No. 17772951.4, dated Nov. 5, 2019, 9 pages.
English translation of Notification of Reasons for Refusal for JP Application No. 2019502127, dated Oct. 29, 2019, 6 pages.
English translation of Notice of Preliminary Rejection for KR Application No. 10-2018-7030771, dated Mar. 26, 2020, 5 pages.
International Search Report issued in PCT/CN2017/072715 dated May 5, 2017.

* cited by examiner

*Primary Examiner* — Guinever S Gregorio
(74) *Attorney, Agent, or Firm* — Armstrong Teasdale LLP

(57) ABSTRACT

Disclosed herein is a method for preparing coal-based, briquetted activated carbon. The method includes subjecting raw coal to a briquetting process, pulverizing the briquettes into particles, and performing carbonization and activation to obtain activated carbon. The briquetting process includes pulverizing raw coal to produce a feed, feeding the feed into a feed bin for degassing, adjusting the temperature and the water content of the feed in the feed bin, and feeding the feed in the feed bin into a briquetting apparatus for briquetting to form coal briquettes. The raw coal briquetting process of the preparation method is suited to a wide variety of coal, including non-caking coal. The preparation method yields a coal briquette product with a strength greater than 89% without any binder, which is beneficial to improve the strength and the like of activated carbon.

20 Claims, No Drawings

PREPARATION METHOD FOR BINDER-FREE, COAL-BASED, BRIQUETTED ACTIVATED CARBON

This application claims priority to International Patent Application No. PCT/CN2017/072715, filed on Jan. 26, 2017, which claims priority to CN Patent Application No. 201610201435.1, filed on Mar. 31, 2016, the disclosures of which are hereby expressly incorporated by reference in their entireties.

TECHNICAL FIELD

The present invention belongs to the field of preparing coal-based activated carbon, and particularly relates to a preparation method for binder-free, coal-based, briquetted activated carbon.

TECHNICAL BACKGROUND

Due to the highly developed pore structure and extremely large specific surface area of activated carbon, its application developed from decolorization and deodorization for food and medicine, gas masks, to large-scale use in solvent refining and recycling, advanced water treatment, flue gas purification and blood purification etc. The development has brought new and higher requirements on the properties such as adsorption and strength of activated carbon.

In addition, in the production of activated carbon, the method of preparing coal-based activated carbon using coal as raw material has been widely used. In order to make the obtained activated carbon have higher strength when used, usually, it is necessary to carry out a briquetting treatment before the coal is carbonized and activated. Therefore, high-strength briquetting of coal is also the basis for the preparation of high-strength activated carbon.

Although pulverized coal briquetting technologies have been widely used in the deep processing of raw coal, various binders such as coal pitch still need to be added in most pulverized coal briquetting technologies, which not only increases the cost, but also the prepared coal briquettes need to be air-dried or heated and roasted, thereby reducing the production efficiency; in addition, since the commonly used binders such as coal pitch and coal tar will melt and volatilize after being heated, so that the strength of the final product is not high, and in the production of activated carbon, residues such as coal pitch will block the pores of activated carbon, some residues also contain harmful substances, which is not conducive to improving the quality of activated carbon, thus limiting the application of non-caking coal in the preparation of coal-based activated carbon.

At present, the research on the preparation of binder-free, coal-based activated carbon has become a hot topic. CN101402454A discloses a preparation method of formed activated carbon, wherein pulverized coal is subjected to press forming before being activated by carbonization, however, in order not to add a binder, a large amount of weak caking coal and strong caking rich coal have to be added to the pulverized coal raw material. Due to the addition of a large amount of caking coal, it is necessary to slowly increase the temperature during the carbonization process to prevent the particles from foaming and coking during the carbonization process, and a long activation time is required to make the obtained activated carbon have a large enough surface area.

CN1033262A discloses a method for preparing activated carbon comprising pulverizing non-caking coal to below 10 μm and then subjecting the pulverized coal to press forming. It is stated in this patent application that the smaller the particle size after pulverization of raw coal, the more advantageous it is to increase the number of contact points per unit weight between the particles to increase the adhesion between the sub-particles in the particles. However, the smaller the particle size after pulverization of pulverized coal, the greater the possibility of agglomeration. Considering the requirement of moisture in subsequent press forming, moisture control is difficult, and pulverization is also difficult, requirements to equipments are high and the method is difficult to popularize. At the same time, studies found that too fine particle size of pulverized coal tends to cause the internal pores to be too fine after briquetting, affecting the escape of subsequent carbonized volatiles and the diffusion of gas used for activation into internal pores when activated carbon is prepared, and thus affecting the yield and adsorption of the final product.

Therefore, it is necessary to propose a new preparation method for binder-free, coal-based, briquetted activated carbon.

SUMMARY OF THE INVENTION

The object of the present invention is to provide a preparation method for a coal-based, briquetted activated carbon, to solve the problem of affecting the quality of activated carbon due to the difficulty of preparing suitable coal briquette during the preparation of coal-based, briquetted activated carbon when no binders are used in the prior art.

In order to achieve the above object, the present invention adopts the following technical solutions:

A preparation method for a coal-based, briquetted activated carbon, the preparation method comprising:

I. subjecting raw coal to a briquetting process to obtain coal briquettes through a forming process, the briquetting process comprises:

a. step of pulverizing the raw coal to obtain pulverized coal, wherein the average particle size of the pulverized coal is at least 20 μm, the content of the pulverized coal with a particle size of up to 80 μm is at least 90 wt %, and the content of the pulverized coal with a particle size ranging between 40 μm-80 μm is at least 10 wt %;

b. step of feeding the pulverized coal obtained in step a into the feed bin of a briquetting apparatus, and degassing the feed in the feed bin;

c. step of adjusting the temperature of the feed in the feed bin to 50° C.-100° C. and the water content to 2 wt %-8 wt %;

d. step of feeding the feed in the feed bin into the briquetting apparatus for briquetting to obtain coal briquettes.

II. The coal briquettes obtained in step I are crushed and granulated, and then subjected to carbonization and activation to obtain activated carbon.

In the preparation method of the present invention, a wide range of raw coals is suitable, which can be one or more of non-caking coal, weak caking coal, weaker medium caking coal, stronger medium caking coal and strong caking coal. The non-caking coal, weak caking coal, weaker medium caking coal, stronger medium caking coal and strong caking coal are well known in the art, i.e. according to the caking index G, they are classified into non-caking coal when G is 0-5, weak caking coal when G is 5-20, weaker medium caking coal when G is 20-50, stronger medium caking coal when G is 50-65, and strong caking coal when G is greater than 65.

Those skilled in the art understand that the higher the caking index of the raw coal, the more favorable it is to form coal briquettes with higher strength, and the lower the caking index of the raw coal, the more difficult it is to form coal briquettes with higher strength. By adjusting various aspects of the raw coal, the briquetting process of the invention achieves success preparation of coal briquettes with high strength from the raw coal with higher caking index or the raw coal with lower caking index, and is particularly suitable for the briquetting of non-caking coal or the raw coal mainly composed of non-caking coal, for example, all the raw coal is non-caking coal, or the content of non-caking coal in the raw coal is more than 50 wt %, such as 60 wt %, 70 wt %, 80 wt % or 90 wt %, and the remainder can be weak caking coal or the like. In the present invention, preferably, the raw coal is non-caking coal; further preferably, the caking index of the non-caking coal is =2, such as 0, 1, or 2.

In the preparation method of the present invention, step a is to pulverize the raw coal to obtain pulverized coal having a specific particle size distribution. Studies have found that when the pulverized coal has the above particle size distribution, a reasonable gradation of pulverized coal with different particle sizes can be achieved during the briquetting process, which can improve the strength of briquettes. Preferably, in the pulverized coal obtained in step a, the content of the pulverized coal with a particle size of up to 80 μm is at least 95 wt %, the content of the pulverized coal with particle size of up to 40 μm is at least 70 wt %; further preferably, the average particle size of the pulverized coal is 20 μm-40 μm, such as 30 μm; more preferably, the particle size of the pulverized coal is up to 200 μm, such as up to 150 μm, or up to 100 μm. Those skilled in the art understand that by selecting a corresponding standard sieve to sieve the pulverized raw coal, the pulverized coal having the above particle size distribution can be obtained. Those skilled in the art certainly understand that the raw coal of the present invention is preferably subjected to treatment such as removal of gangue and/or reduction of ash prior to use, for example, to make ash content no more than 6 wt %, such as 2 wt %-5 wt %, or 3 wt %.

In the preparation method of the present invention, step b is to feed the pulverized coal into the feed bin of a briquetting apparatus, and degassing the feed in the feed bin to reduce the air adsorbed between pulverized coal particles and on the surface of pulverized coal particles, which is advantageous to increase the strength of briquettes. Those skilled in the art understand that the purpose of degassing can be achieved by pumping gas out of the feed bin (or vacuuming the feed bin), for example, a filter plate can be placed on the top and/or the side wall of the feed bin (make sure that the gas can escape but the pulverized coal cannot), and a vacuuming device is connected to the back of the filter plate to discharge the gas adsorbed in the pulverized coal through the filter plate and the vacuum system. Preferably, in step b, the pressure in the feed bin is a negative pressure, and the negative pressure is 0 kPa-3 kPa (as understood by those skilled in the art, since it is a negative pressure, the endpoint value 0 is not included), for example, 0.6 kPa, 1 kPa or 2 kPa; further preferably, the negative pressure of the feed bin is adjusted to 2.5 kPa-3 kPa.

In the preparation method of the present invention, step c is to adjust the temperature and moisture of the pulverized coal so that the temperature of the material in the feed bin is 50° C.-100° C., and the moisture content is 2 wt %-8 wt %. Preferably, the temperature of the material in the feed bin is 70° C.-85° C. and the moisture content is 2 wt %-6 wt %, such as 3 wt % or 4 wt %. Reasonable moisture content can play the role of material binder in the subsequent press briquetting process, and is advantageous to reduce the amount of gas adsorbed on the surface of pulverized coal particles. However, too high moisture will affect the bonding between the pulverized coal particles, and will make the subsequent treatment by degassing device difficult. In addition, the above temperature range is advantageous for the softening of the pulverized coal particles, and further for the briquetting of the pulverized coal particles, but if the temperature is too high, it will cause the water in the pulverized coal to escape. Therefore, the above-mentioned degassing treatment and the adjustment of temperature and moisture are closely related, and have an important influence on the briquetting of the pulverized coal respectively. Extensive studies have found that when the temperature and moisture content of the material in the feed bin are kept within the above range, it is advantageous for the bonding and briquetting of the pulverized coal. Those skilled in the art understand that the process of adjusting the temperature and moisture can be carried out in the feed bin, or during other treatment processes and/or the process of conveying the pulverized coal, for example, adjusting the water content when pulverizing the raw coal so that the moisture content of the material in the feed bin meets the requirement, and heating the pulverized coal during the process of conveying the pulverized coal so that the temperature of the material in the feed bin meets the requirement, which are well known in the art and will not be described herein.

In the preparation method of the present invention, step d is to feed the feed in the feed bin into a briquetting apparatus for briquetting. According to a preferred embodiment of the present invention, the material in the feed bin is fed into the briquetting apparatus through a screw forced feeder, so that the volume of the pulverized coal is reduced due to the pressure of the forced feed screw when it is fed into the briquetting apparatus, and the adsorbed gas is extruded, thereby facilitating further degassing. In the present invention, the material can be briquetted in a variety of ways, such as extrusion forming, compression forming, or roll forming. Accordingly, there may be a plurality of briquetting apparatus, which are well known in the art. Preferably, the briquetting apparatus is a double roller briquetting apparatus; further preferably, the line pressure between the rollers is 7 t/cm-15 t/cm, preferably 10 t/cm-15 t/cm when briquetting, to improve the briquetting effect.

According to the preparation method of the present invention, preferably, the briquetting process further comprises step e, crushing a portion of the coal briquettes to coal particles having particle sizes of up to 3 mm, preferably 0.5 mm-2.5 mm, such as 1 mm or 2 mm, and feeding the coal particles accounting for 10 wt %-40 wt %, preferably 25 wt %-30 wt % of the mass of the pulverized coal in the feed bin into the feed bin. Studies accidentally found that, when the above coal particles are briquetted after being mixed with the pulverized coal, they can form the core of coal briquette skeleton during the pressing process, thereby effectively increasing the strength of the coal briquettes.

According to the preparation method of the present invention, preferably, the forming process further comprises step a1, blending coal before pulverizing the raw coal in step a, so that the grindability index of the raw coal is at least 55%, preferably 60%-80%, such as 65% or 75%. The grindability index reflects the hardness and brittleness of the raw coal.

Studies found that it is beneficial to further improve the subsequent briquetting effect when the grindability index of the raw coal is adjusted to the above range by blending coal.

According to the preparation method of the present invention, preferably, the briquetting process further comprises step b1, feeding the pulverized coal into a stirring bin for stirring and pre-degassing before the pulverized coal enters the feed bin of step b, so that the density of the pulverized coal after pre-degassing is 0.6 kg/L-0.8 kg/L. For example, a closed stirring bin is used to stir the pulverized coal, and gases are pumped out while stirring to facilitate subsequent press forming. According to a preferred embodiment of the invention, the pulverized coal in the stirring bin is fed into the feed bin by a twin screw feeder or a star valve. The twin screw feeder and the star valve have squeezing effects on the pulverized coal during the process of conveying the pulverized coal, which is advantageous to reduce the gas adsorbed by the pulverized coal or mixed with the pulverized coal during transportation, achieving a smooth transportation of the pulverized coal.

In the preparation method of the present invention, in step II, the coal briquettes obtained in step I are crushed and granulated, and then subjected to carbonization and activation to obtain activated carbon. Crushing and granulating coal briquettes and subjecting the granules obtained by granulation to carbonization and activation are common processing steps in the preparation of activated carbon, and are well known to those skilled in the art.

According to the preparation method of the present invention, the material can be crushed and granulated by means well known to those skilled in the art, for example, using a crusher to crush and granulate the coal briquettes. Preferably, the particle size of the material obtained by granulation is 1 mm-10 mm, preferably 6.7 mm-8 mm.

In the present invention, the conditions of carbonization can be as follows: the temperature is 300° C.-500° C., the oxygen content of the carbonized atmosphere is up to 5 vol %, and the carbonization time is 1.5 hours-4 hours. After carbonization, the strength of material is improved, and some cracked carbon structures are formed in hydrocarbons, which have a certain adsorption capacity and will form more developed microporous structures during the activation process. The conditions of activation can be as follows: using water vapour as the activation medium and carrying out the activation reaction at 850° C.-950° C. for a reaction time of 3 hours-8 hours.

According to a preferred embodiment of the present invention, in step II, the granulated material is first subjected to an oxidation treatment prior to carbonization to perform a partial oxidation reaction in an oxidant. The oxidation treatment conditions of the present invention can be as follows: using a mixture of nitrogen and air as the oxidant which has an oxygen content of 8 vol %-15 vol % and oxidizing the material at 200° C.-250° C. for 1.5 hours-4 hours to control the oxidation of the material to a lower extent, which is advantageous for the pre-oxidation of the high-strength granules of the present invention and can reduce the degree of graphitization and increase the porosity in the subsequent carbonization process.

Compared with the prior art, the preparation method of the present invention has the following advantages:

1. the raw coal briquetting process of the present invention is suited to a wide variety of coal, even using non-caking coal which is the most difficult coal to be briquetted as the raw coal, a coal briquette product with a strength greater than 89% still can be produced without any binder, which is beneficial to improve the strength and the like of an activated carbon;

2. no binder is added during the briquetting process, which reduces the cost, also avoids the subsequent air-drying and stoving process, and improves the production efficiency;

3. in the present invention, there's no need to pulverize the raw coal to an excessively small particle size in the raw coal briquetting process, which is favorable for the formation of internal pores when preparing activated carbon;

4. the present invention is particularly suitable for preparing activated carbon using non-caking coal or mixed coal mainly composed of non-caking coal as the raw coal, as the caking index of the overall raw coal is low, it is conductive to a further improvement of the quality of activated carbon.

EMBODIMENTS

The present invention will be described in details below with the combination of examples, but the invention is not limited thereto.

In the following examples/comparative examples, the characterization methods of the relevant parameters are described as follows:

Average particle size-GB/T 19077.1-2008 particle size analysis laser diffractometry Grindability index-GB/T 2565-2014 method for determining the grindability index of coal (i.e. Had Grove method)

Drum strength-measured according to GB/T7702.3-2008.

The characterization methods of the relevant parameters of activated carbon are described as follows:

Iodine adsorption value-measured according to GB/T7702.3-2008;

Methylene blue adsorption value-measured according to GB/T7702.6-2008;

Specific surface area-calculated by the BET method;

Strength-measured according to GB/T7072.3-2008.

The remaining parameters are characterized by national standard or conventional characterization in the field.

In the following examples/comparative examples, raw coal is selected from one or more of the following coal types:

Xinjiang Hami coal, from Xinjiang Baoli coal mine, its indicators are: moisture is 5.17 wt %, air drying based ash is 1.31 wt %, dry ashless based volatiles is 35.54 wt %, caking index is 2, belongs to non-caking coal, characteristic of coal cinder is 3, grindability index is 55%;

Long flame coal of Heishan mining area, from Toksun Heishan coal mine in Xinjiang, its indicators are: moisture is 3.43 wt %, air drying based ash is 3.52 wt %, dry ashless based volatiles is 37.16 wt %, caking index is 0, belongs to non-adhesive coal, characteristic of coal cinder is 3, grindability index is 68%.

In the following examples/comparative examples, the briquetting apparatus is a double roller briquetting apparatus, manufacturer: BEPEX; model: MS150.

Example 1

(1) Xinjiang Hami coal was pulverized to pulverized coal having an average particle size of 29 μm and sieved, wherein the content of the pulverized coal with a particle size larger than 80 μm was 2.5 wt %; the content of the pulverized coal with a particle size larger than 40 μm was 28 wt %;

(2) the pulverized coal obtained in step (1) was fed into the feed bin of the briquetting apparatus, and the material in the feed bin was degassed to maintain the negative pressure in the feed bin at 2.5 kPa-3 kPa;

(3) the temperature of the material in the feed bin was maintained at 50° C.-55° C., and the moisture content of the material in the feed bin was adjusted to 7 wt %-8 wt %;

(4) the material in the feed bin was fed into the briquetting apparatus for briquetting, and the line pressure between the rollers was about 11 t/cm-12 t/cm during briquetting to obtain briquetted material (coal briquette).

The strength of the coal briquette was tested, and the drum strength thereof was 89.2%.

Example 2

The difference between example 1 and example 2 lies in that the mixture of Xinjiang Hami coal and Changyan coal of Heishan mining area in a mass ratio of 1:1 was used as the raw coal in example 2.

The strength of the coal briquette was tested, and the drum strength thereof was 91.4%.

Example 3

(1) Xinjiang Hami coal and long flame coal of Heishan mining area were mixed evenly according to a mass ratio of 1:1, and the mixture was pulverized to pulverized coal having an average particle size of 35 μm and sieved, wherein the content of the pulverized coal with a particle size larger than 80 μm was 8.2 wt %; the content of the pulverized coal with a particle size larger than 40 μm was 22 wt %;

(2) the pulverized coal obtained in step (1) was fed into a stirring bin for stirring and degassing, the top of the stirring bin was provided with a pipeline for pumping out gas, so that the density of the pulverized coal after stirring reached 0.60 kg/L-0.65 kg/L, and then the pulverized coal in the stirring bin was fed into the feed bin of the briquetting apparatus through a star valve;

(3) the material in the feed bin was degassed to maintain the negative pressure in the feed bin at 2.5 kPa-3 kPa;

(4) the temperature of the material in the feed bin was maintained at 80° C.-85° C., and the moisture content of the material in the feed bin was adjusted to 2 wt %-3 wt %;

(5) the material in the feed bin was fed into the briquetting apparatus through a screw forced feeder for briquetting, the line pressure between the rollers was about 11 t/cm-12 t/cm when briquetting, to obtain briquetted material.

The strength of the coal briquette was tested, and the drum strength thereof was 91.8%.

Example 4

(1) Xinjiang Hami coal was pulverized to pulverized coal having an average particle size of 22 μm and sieved, wherein the content of the pulverized coal with a particle size larger than 80 μm was 2 wt %; the content of the pulverized coal with a particle size larger than 40 μm was 15 wt %;

(2) the pulverized coal obtained in step (1) was fed into a feed bin of the briquetting apparatus, and the coal briquette prepared in example 1 was crushed to coal particles having a particle size of 1 mm-3 mm, and the coal particles accounting for 25 wt % of the mass of the pulverized coal in the feed bin were fed into the feed bin;

(3) the material in the feed bin was degassed to maintain the negative pressure in the feed bin at 2 kPa-2.5 kPa;

(4) the temperature of the material in the feed bin was maintained at 50° C.-55° C., the moisture content of the material in the feed bin was adjusted to 5 wt %-6 wt %;

(5) the material in the feed bin was fed into the briquetting apparatus through a screw forced feeder for briquetting, the line pressure between the rollers was about 11 t/cm-12 t/cm when briquetting, to obtain briquetted material.

The strength of the coal briquette was tested, and the drum strength thereof was 92.6%.

Example 5

(1) The pulverized coal obtained in step (1) of example 4 was fed into a stirring bin for stirring and degassing, the top of the stirring bin was provided with a pipeline for pumping out gas, so that the density of the pulverized coal after stirring reached 0.75 kg/L-0.80 kg/L;

(2) the pulverized coal in the stirring bin was fed into the feed bin of the briquetting apparatus through a twin screw feeder, and the coal briquettes prepared in example 3 was crushed to coal particles having a particle size of 1 mm-3 mm, and the coal particles accounting for 35 wt % of the mass of the pulverized coal in the feed bin were fed into the feed bin;

(3) the material in the feed bin was degassed to maintain the negative pressure in the feed bin at 2.5 kPa-3 kPa;

(4) the temperature of the material in the feed bin was maintained at 70° C.-75° C., and the moisture content of the material in the feed bin was adjusted to 2 wt %-3 wt %;

(5) the material in the feed bin was fed into the briquetting apparatus through a screw forced feeder for briquetting, the line pressure between the rollers was about 11 t/cm-12 t/cm when briquetting, to obtain briquetted material.

The strength of the coal briquettes was tested, and the drum strength thereof was 94.3%.

Comparative Example 1

Water was sprayed to Xinjiang Hami coal to adjust its water content to 12 wt %, and then Xinjiang Hami coal was pulverized to material having an average particle size of 8.1 μm to obtain pulverized coal. The obtained pulverized coal was fed into the briquetting apparatus for briquetting, and the line pressure between the rollers was about 11 t/cm-12 t/cm when briquetting, to obtain briquetted material.

The strength of briquetted material was tested, and the drum strength thereof was 90.4%.

Comparative Example 2

Xinjiang Hami coal was crushed to particles below 10 mm, the coal pitch accounting for 10 wt % of the particles was added, and the mixture was pulverized and sieved to prepare pulverized coal having a particle size of 64 μm-80 μm. The obtained pulverized coal was fed into the briquetting apparatus for briquetting, and the line pressure between the rollers was about 11 t/cm-12 t/cm when briquetting, to obtain briquetted material.

The strength of briquetted material was tested, and the drum strength thereof was 85%

Comparative Example 3

Xinjiang Hami coal was pulverized and sieved to prepare pulverized coal having a particle size of 64 μm-80 μm, and the coal tar accounting for 30 wt % of the pulverized coal was added. After stirring evenly in a blender, the mixture was fed into a plodder to prepare coal briquettes with standard size. The coal briquettes was air-dried at 20° C. for 48 hours and then stoved at 200° C. for 2 hours.

The strength of the coal briquettes was tested, and the drum strength thereof was 91.8%.

Example 6-10

The coal briquettes prepared in examples 1-5 were subjected to granulation, oxidation, carbonization and activation respectively, wherein granules having a particle size of 6.7 mm-8 mm were obtained by the granulation of the coal briquettes.

The oxidizing conditions of the granules were as follows: a mixed gas of nitrogen and oxygen was introduced into an external-heating rotary kiln heated by electric, the oxygen content was controlled to be about 8 vol %, and the reaction was carried out at 220° C. for 4 hours. The carbonization conditions were as follows: the granules were calcined in the external-heating rotary kiln heated by electric with flowing nitrogen at 500° C. for 4 hours to be carbonized. The activation conditions were as follows: in the presence of an activator, i.e. flowing steam having a flow rate of 1.5 kg of the steam per kilogram of carbonized particles per hour, the carbonized particles in the rotary kiln were activated at 900° C. for 4 hours to obtain activated carbon products.

The above activated carbon products were characterized separately, as shown in Table 1.

TABLE 1

| Item | Example 6 | Example 7 | Example 8 | Example 9 | Example 10 |
|---|---|---|---|---|---|
| Iodine adsorption value mg/g | 1090 | 1069 | 1100 | 1063 | 1093 |
| Methylene blue adsorption value mg/g | 212 | 198 | 219 | 201 | 219 |
| Specific surface area m$^2$/g | 957 | 947 | 998 | 937 | 1001 |
| Strength % | 96.4 | 96.7 | 96.2 | 97.1 | 95.4 |
| Yield wt % | 27 | 27 | 25 | 26 | 25 |

The invention claimed is:

1. A method for preparing coal-based, briquetted activated carbon, the method comprising:
   I. briquetting raw coal to obtain coal briquettes, wherein briquetting comprises:
      a. pulverizing the raw coal to obtain pulverized coal, wherein, the average particle size of the pulverized coal is at least 20 the content of the pulverized coal with a particle size of up to 80 μm is at least 90 wt %, and the content of the pulverized coal with a particle size ranging between 40 μm-80 μm is at least 10 wt %;
      b. feeding the pulverized coal into a feed bin of a briquetting apparatus, and degassing the pulverized coal in the feed bin;
      c. adjusting the temperature of the pulverized coal in the feed bin to 50° C.–100° C. and the water content to 2 wt %-8 wt %;
      d. feeding the pulverized coal in the feed bin into the briquetting apparatus for briquetting to obtain coal briquettes, and
   II. crushing and granulating the coal briquettes obtained in step I, and
      carbonizing and activating the crushed and granulated coal briquettes thereby obtaining activated carbon.

2. The method according to claim 1, wherein briquetting further comprises:
   e. crushing a portion of the coal briquettes to coal particles having particle sizes of up to 3 mm and feeding the coal particles into the feed bin, wherein
   the coal particles comprise from 10 wt % to 40 wt % of the mass of the pulverized coal.

3. The method according to claim 2, wherein the pulverized coal in the feed bin is fed into the briquetting apparatus through a screw forced feeder and the briquetting apparatus is a double roller briquetting apparatus.

4. The method according to claim 2, wherein briquetting further comprises:
   blending the raw coal before pulverizing,
   wherein the grindability index of the raw coal is at least 55%.

5. The method according to claim 2, wherein briquetting further comprises:
   feeding the pulverized coal into a stirring bin for stirring and pre-degassing before the pulverized coal is fed into the feed bin,
   wherein the density of the pulverized coal after pre-degassing is 0.6 kg/L-0.8 kg/L.

6. The method according to claim 2, wherein in the pulverized coal the content of the pulverized coal with a particle size of up to 80 μm is at least 95 wt %, and the content of the pulverized coal with a particle size of up to 40 μm is at least 70 wt %.

7. The method according to claim 1, wherein feeding the pulverized coal into the feed bin comprises using a screw forced feeder and the briquetting apparatus is a double roller briquetting apparatus.

8. The method according to claim 7, wherein briquetting further comprises:
   blending the raw coal before pulverizing,
   wherein the grindability index of the raw coal is at least 55%.

9. The method according to claim 7, wherein briquetting further comprises:
   feeding the pulverized coal into a stirring bin for stirring and pre-degassing before the pulverized coal is fed into the feed bin,
   wherein the density of the pulverized coal after pre-degassing is 0.6 kg/L-0.8 kg/L.

10. The method according to claim 7, wherein in the pulverized coal the content of the pulverized coal with a particle size of up to 80 μm is at least 95 wt %, and the content of the pulverized coal with a particle size of up to 40 μm is at least 70 wt %.

11. The method according to claim 1, wherein briquetting further comprises:

a1. blending the raw coal before pulverizing,
wherein the grindability index of the raw coal is at least 55%.

12. The method according to claim 11, wherein briquetting further comprises:
feeding the pulverized coal into a stirring bin for stirring and pre-degassing before the pulverized coal is fed into the feed bin,
wherein the density of the pulverized coal after pre-degassing is 0.6 kg/L-0.8 kg/L.

13. The method according to claim 1, wherein briquetting further comprises
b1. feeding the pulverized coal into a stirring bin for stirring and pre-degassing before the pulverized coal is fed into the feed bin,
wherein the density of the pulverized coal after pre-degassing is 0.6 kg/L-0.8 kg/L.

14. The method according to claim 13, wherein the pulverized coal in the stirring bin is fed into the feed bin by a twin screw feeder or a star valve.

15. The method according to claim 1, wherein in the pulverized coal the content of the pulverized coal with a particle size of up to 80 μm is at least 95 wt %, and the content of the pulverized coal with a particle size of up to 40 μm is at least 70 wt %.

16. The method according to claim 1, wherein the pressure in the feed bin is a negative pressure, and the negative pressure is 1 kPa-3 kPa.

17. The method according to claim 1, wherein the temperature of the pulverized coal in the feed bin is 70° C.-85° C. and the moisture content of the pulverized coal is 2 wt %-6 wt %.

18. The method according to claim 1, wherein the crushed and granulated coal briquettes are subjected to an oxidation treatment prior to carbonization,
wherein the oxidation treatment comprises: using a mixture of nitrogen and air as the oxidant which has an oxygen content of 8 vol %-15 vol % and oxidizing the pulverized coal at 200° C.-250° C. for 1.5 hours-4 hours.

19. The method according to claim 1, wherein carbonizing comprises: the temperature is 300° C.-500° C., the oxygen content of the carbonization atmosphere is up to 5 vol %, and the carbonization time of 1.5 hours-4 hours.

20. The method according to claim 1 wherein activating comprises: using water vapour as an activation medium and carrying out the activation reaction at 850° C.-950° C. for a reaction time of 3 hours-8 hours.

* * * * *